Jan. 29, 1924.

C. KERN ET AL 1,482,195

DOUGH WORKING MACHINE

Filed Nov. 22, 1919

Inventors:
Charles Kern,
August Kaminski.
By L. G. Fletcher
Atty.

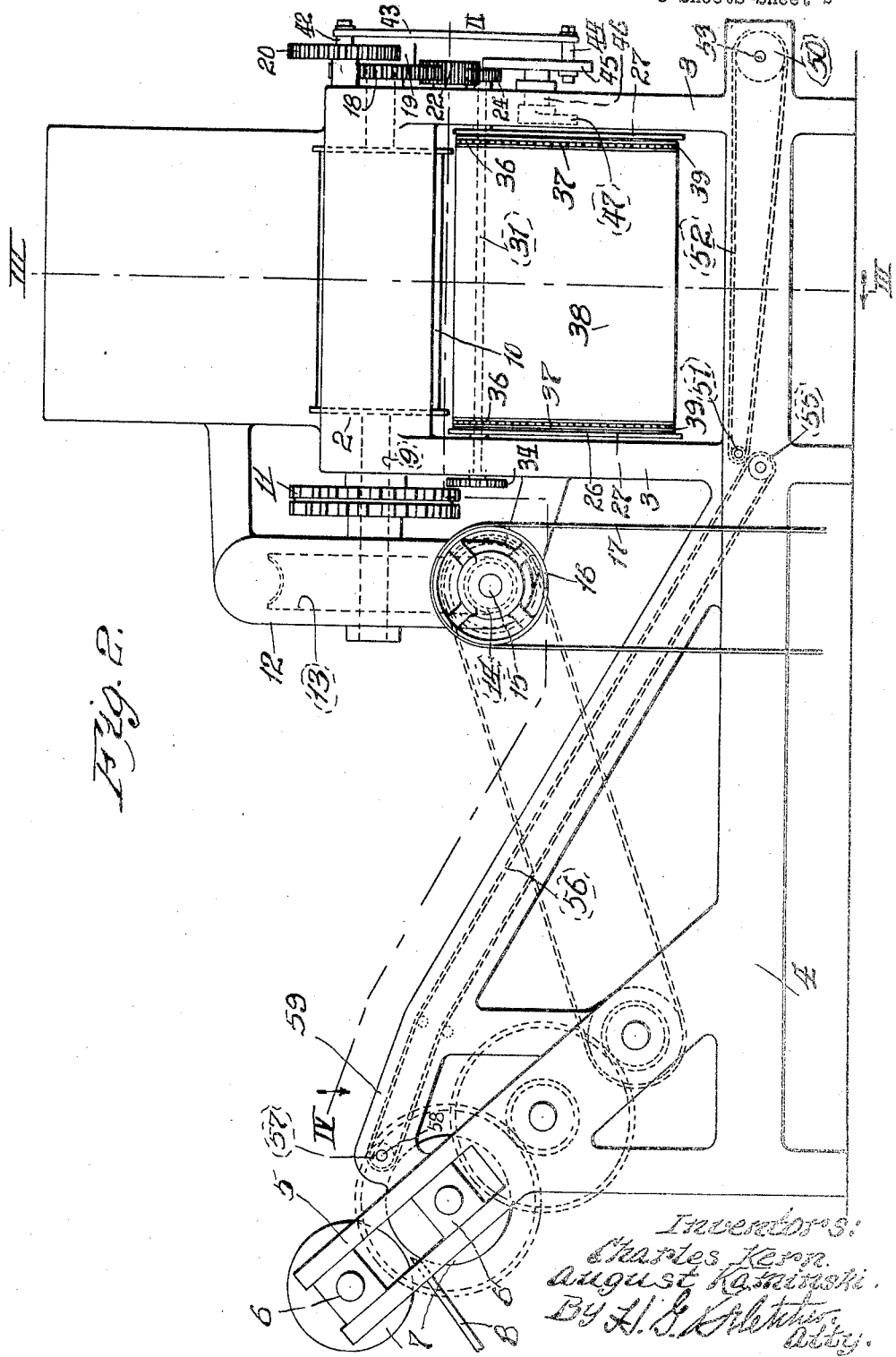

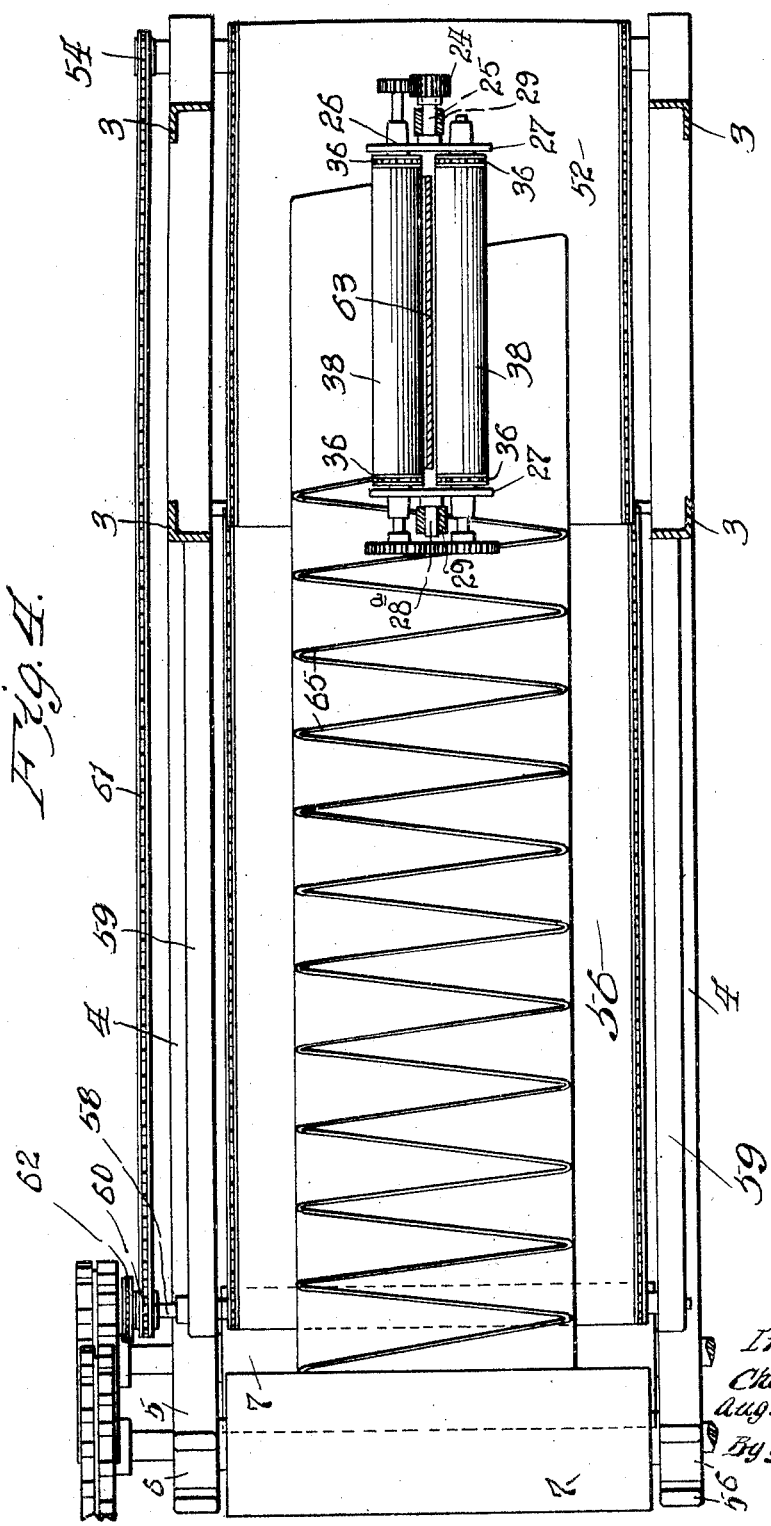

Patented Jan. 29, 1924.

1,482,195

UNITED STATES PATENT OFFICE.

CHARLES KERN AND AUGUST KAMINSKI, OF ST. LOUIS, MISSOURI, ASSIGNORS, BY MESNE ASSIGNMENTS, TO PETERS MACHINERY COMPANY, OF CHICAGO, ILLINOIS, A CORPORATION OF ILLINOIS.

DOUGH-WORKING MACHINE.

Application filed November 22, 1919. Serial No. 340,017.

*To all whom it may concern:*

Be it known that we, CHARLES KERN and AUGUST KAMINSKI, citizens of the United States of America, and residents of the city of St. Louis and State of Missouri, have invented certain new and useful Improvements in a Dough-Working Machine, of which the following is a specification.

The primary object of this invention is to provide an improved machine for working on dough before the dough is operated on by the cutting machine relative to the manufacture of crackers, cookies and the like.

Another object of this invention is to provide an improved machine for rolling the dough in different directions, in which the dough is first rolled and is then cross rolled so as to more thoroughly work the dough, whereby the dry granular particles of the flour are eliminated.

A further object is in providing an improved mechanism for receiving the dough after first being rolled, so that the dough after being worked upon by the first roller set can be worked upon in a different direction by another set of rollers.

Other and further objects will appear in the specification and be specifically pointed out in the appended claims, reference being had to the accompanying drawings exemplifying the invention, and in which, Figure 1 is an end elevation of this improved dough working machine.

Figure 2 is a side elevation of Fig. 1.

Figure 4 is a horizontal view, partly in section, taken on the line IV—IV of Fig. 2.

Figure 3:
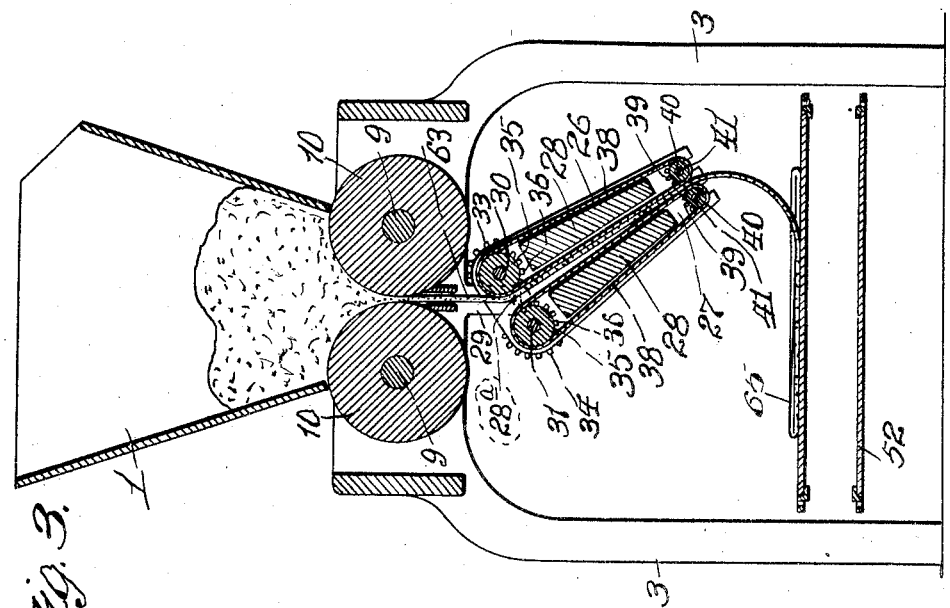
Figure 3 is a transverse vertical section taken on the line III—III of Fig. 2.

As aforementioned in one of the objects of this invention, the prime intent thereof is to provide improved means in a dough working machine for rolling the dough in different directions, in which after the dough has been rolled by a first set of rollers the rolled dough is then engaged and laid in such a position whereby it will be engaged and rolled in another direction by another set of rollers, thereby more thoroughly working the dough. In this connection, the drawings disclose a receiving hopper 1 which is supported on the frame work 2, said frame work having the supporting legs 3, and extending rearwardly from a pair of legs 3 is an extension frame 4 having upwardly extending portions such as 5, said upward extending portions 5 adjustably supporting boxings 6, said boxings providing bearings for a pair of spaced apart squeezing rollers 7, said rollers 7 being in communication with a receiving table 8 of a cutting machine not shown.

Supported in the frame 2 are a pair of shafts 9, and mounted on each of said shafts is a roller 10, said rollers being spaced apart and located at the lower end of the hopper 1, and mounted at one end to each of said shafts 9 is a cog wheel 11, said cog wheels being in mesh with each other.

One of the shafts 9 adjacent its respective cog wheel 11 extends into a housing 12, and mounted on said shaft in said housing is a worm wheel 13 which is in mesh with the worm gear 14, said gear being mounted on the driving shaft 15, and mounted on the shaft 15 is a pulley 16, said pulley being operated by the belt 17 which leads from a line shaft, not shown.

Mounted on the shaft 9 on which the worm wheel 13 is mounted, but on the opposite end thereof, is a spur wheel 18, and secured to said shaft adjacent said spur wheel is a pinion 19 in mesh with the spur wheel 20, said spur wheel 20 being loosely mounted on the stub-shaft 21.

Meshing with the spur wheel 18 is an idler gear 22 which is mounted on a stub-shaft 23, said gear 22 also being in mesh with a pinion 24, said pinion 24 being loosely mounted on a rigidly held stub shaft 25 which is carried by the swinging frame 26.

This swinging frame 26 is comprised of a pair of side members 27 which are spaced apart by the spacer members 28, the rigidly held shaft 25 extending from one of the side members 27 whereas on the other side member 27 is a fixed stub shaft 28ª, said stub shaft 28ª being oppositely disposed from the stub shaft 25, said stub shafts 25 and 28ª being supported in respective bearings 29 which depend from the frame 2.

Supported in the upper ends of the side members 27 of the frame 26 are a pair of spaced apart horizontally arranged shafts 30 and 31, and securely mounted to one end of the shaft 30 is a gear 32, which is in mesh with the pinion 24 that is mounted on the extension 25.

Mounted on the opposite end of the shaft 30 is a gear 33, said gear being in mesh with a matching gear 34 that is mounted on the shaft 31. Rigidly secured to each of the shafts 30 and 31 is a roller 35, and secured to each roller at each end is a sprocket 36, and supported between the endless sprocket chains 37 that are mounted over each of the sprockets 36 is an endless apron 38, each pair of chains 37 of each apron engaging respective sprockets 39, there being a pair of sprockets 39 secured to the return rollers 40, a pair of which is mounted between the lower ends of the side members 27 of the frame 26, as shown more clearly in Fig. 3.

Each of the rollers 40 is mounted on a respective shaft 41. Extending from one side of the spur wheel 20 is a pin 42, said pin being for the support of one end of a connecting rod 43, the opposite end of said rod being mounted on a pin 44 that is carried by the rocking disc 45, said disc 45 being secured to one end of a rock shaft 46 which is supported in a bearing provided by one of the supporting legs 3 of the frame 2, and secured to the opposite end of said rock shaft 46 is a rocker arm 47, and connected to said rocker arm is a connecting rod 48, said rod also being engaged at 49 to the frame 26. Supported between the legs 3 of the frame 2 adjacent the bottom thereof are a pair of rollers 50 and 51, said rollers and the endless apron mounted thereover comprising a conveyor 52, and mounted on one end of the shaft 53 which supports the roller 50 is a sprocket 54. The roller 51 is engaged above the roller 55, and mounted over said roller 55 is an endless apron 56, said apron passing around a roller 57 which is mounted on the horizontal shaft 58, said shaft being supported in the super structure 59 of the extension frame 4, and mounted on one end of said shaft 58 is a sprocket 60, said sprocket being in alinement with the sprocket 54 of the roller 50, and mounted over said sprockets 54 and 60 is an endless chain 61. Secured to the shaft 58 adjacent the sprocket 60 is a driving sprocket 62.

In the operation of an improved dough working machine of this character, dough is taken from the dough batch tank and placed into the hopper 1, and upon power being given to the machine, the rollers 10 are revolved downwardly towards each other, thereby forcing the dough from the hopper between said rollers, thereby producing a continuous dough layer designated as 63, said dough layer 63 passing between opposing conveyors formed by the endless aprons 38 of the frame 26, see Fig. 3. The frame 26 is swingingly depended beneath the rollers 10 by the stub shafts 25 and 28ª, said shafts being supported in the bearings 29, swinging motion being imparted to the frame 26 by the connecting rod 48, the rock shaft 46 which imparts reciprocatory movement to said connecting rod receiving its rocking movement through the connecting rod 43 which connects the gear 20 and disc 45 together, said gear 20 receiving its motion from the pinion 19 which is mounted on one of the roller shafts 9.

In order to assist the dough layer 63 in its travel between the endless aprons 38 of the swinging frame 26, motion is imparted to said aprons in which the adjacent inner faces thereof travel in the same direction, the speed of the aprons 38 being equal to the travelling speed of the descending dough layer therebetween. Motion is given to the respective rollers and sprockets of the swinging frame 26 through the pinions 24 and 32, the pinion 24 being in mesh with the pinion 22 which meshes with the spur gear 18 of one of the roller shafts 9.

Figure 1:
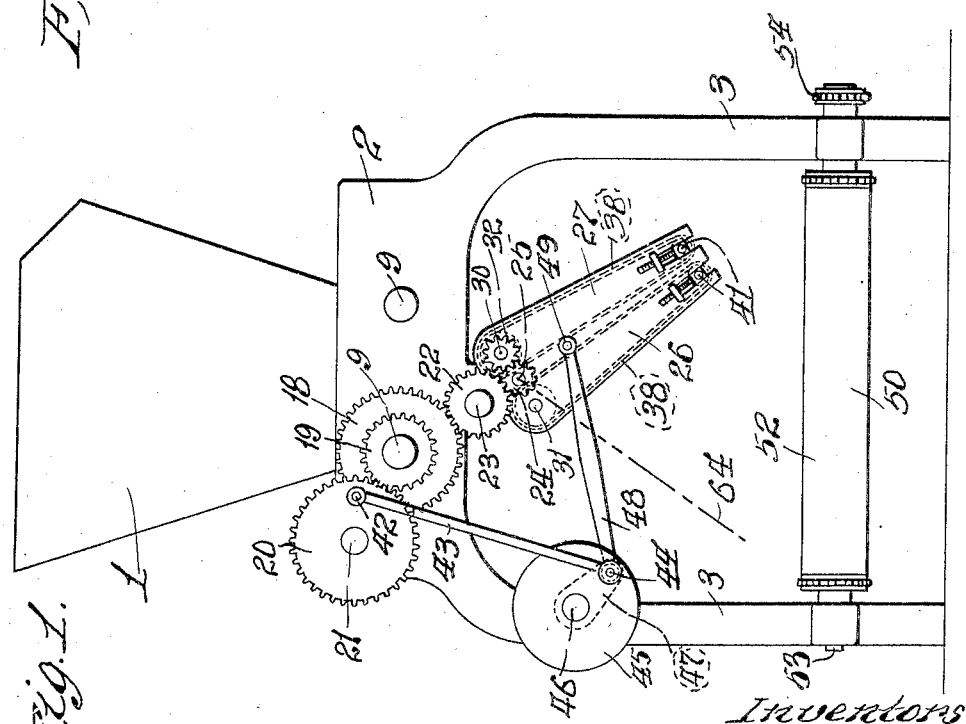

From the approximate position of the swinging frame 26 as shown in Figs. 1 and 3, the frame 26 is swung rearward to the approximate line designated by 64 in Fig. 1, which swinging movement of said frame will cause the dough layer 63 to be folded transversely on the conveyor 52 as designated by the numeral 65, the travel of the conveyor 52 being to the left hand or rearward of the machine and the speed thereof being given relative to the dough folding discharge of the swinging frame 26.

From the conveyor 52 the folded dough layers 65 are fed onto the inclining conveyor 56, said inclining conveyor leading to a position adjacent the pair of rollers designated by the numeral 7, the dough layers being deposited from the conveyor 56 onto the lowermost roller 7 from where it will be engaged between both of the rollers 7, said rollers rolling and squeezing the dough in a direction different than that given the dough when it passed between the rollers 10.

From the aforesaid description of this improved dough working machine, it is to be noted that on account of the swinging frame 26 being arranged between the pairs of rollers 10 and 7, the dough layer after having passed between the rollers 10 is laid cross wise or transversely of the conveyor 52 so that the rollers 7 will attack and cross roll the dough, thereby working the dough in a direction at right angles to the direction in which the dough was previously worked upon by the rollers 10, and in which certain particles in the dough not being previously affected by the first pair of rollers 10, will be worked upon from another direction by the pair of rollers 7.

After the dough has passed between the pair of rollers 7 it is received by the receiving table 8 of the cutting machine which cuts and forms the crackers or cakes into the desired shape from the dough layer as it passes through the cutting machine. Another valuable function produced by this improved dough working machine is that the dough after leaving the first pair of rollers adjacent the hopper 1 is fed through the machine to and between the rollers 7 and to the cutting machine in a continuous dough layer, in which there will be no joined edges in the dough layer.

What we claim is:

1. In a dough working machine, a dough folding mechanism comprised of a single swinging frame bearing a pair of spaced apart opposing conveyors.

2. In a dough working machine, a dough folding mechanism comprised of a single swinging frame bearing a pair of spaced apart opposing conveyors having their adjacent faces travelling in the same direction.

3. In a dough working machine, a dough folding mechanism comprised of a single swinging frame bearing a pair of spaced apart opposing conveyors held a set distance apart, and operating means for swinging said frame.

4. In a dough working machine, the combination with a source of dough supply, of two separate sheeting means adapted to work said dough into a continuous dough sheet, and means for folding said dough sheet transversely of its length intermediate of said two sets of sheeting means, comprising a depending swinging frame bearing a pair of opposing conveyors held immovable against being moved away from each other.

5. In a dough working machine, the combination with an endless travelling support, of a dough hopper, a pair of sheeting rolls arranged there adjacent, a folding mechanism arranged below said sheeting rolls comprising a pair of opposing conveyors adapted to swing from a single fulcrum and held a set distance apart from one another, and means for swinging said mechanism whereby to deposit the dough sheet as it is passed from between said sheeting rolls from said travelling support in folds arranged transversely of the dough sheet.

6. In a dough working machine, the combination with an endless travelling support, of a dough hopper, a pair of sheeting rolls arranged there adjacent, a folding mechanism arranged below said sheeting rolls comprising a pair of opposing conveyors adapted to swing from a single fulcrum and held a set distance apart from one another, and means for swinging said mechanism whereby to deposit the dough sheet as it is passed from between said sheeting rolls from said travelling support in folds arranged transversely of the dough sheet, and a second set of sheeting rolls arranged at right angles to said first mentioned sheeting rolls for resheeting said lapped dough sheet.

7. In a dough working machine, a reciprocable propelling agent having dough engaging faces which are held fixedly apart during reciprocation of said agent, said faces providing means for guiding the dough in a continuous sheet.

8. In a dough working machine, a reciprocable propelling agent, having a pair of opposing dough engaging faces between which the dough is travelled, said faces being held fixedly apart during the reciprocation of said agent.

9. In a dough working machine, the combination of a receiving hopper, a pair of rollers located adjacent the discharge end of said hopper, a swingingly mounted depending guiding member comprised of a pair of endless belts held apart a set given distance located beneath said rollers, and a conveyor in communication with the discharge end of said member.

10. In a dough working machine, a receiving hopper, a pair of spaced apart rollers located at one end of said hopper forming a discharge end thereto, and a pair of spaced apart swingingly mounted conveyors depending from beneath said rollers held against being moved apart from one another during their swinging movement.

11. In a dough working machine, a receiving hopper, a pair of spaced apart rollers located at one end of said hopper forming a discharge end thereto, a pair of spaced apart swingingly mounted conveyors depending from beneath said rollers, held against being moved towards each other during their swinging movement, and another conveyor in communication with the discharge end of said pair of conveyors.

12. In a dough working machine, a receiving hopper, a pair of spaced apart rollers located at one end of said hopper forming a discharge end thereto, a pair of conveyors depending from beneath said rollers, a swinging frame for supporting and holding said conveyors in a fixed position to one another, another conveyor in communication with the discharge end of said pair of conveyors, and a second pair of rollers for receiving the material after it has been acted on by said conveyors.

13. In a dough working machine, the combination of a pair of rollers, a swingingly mounted frame depending beneath said rollers bearing a pair of traveling opposing aprons fixedly held against being moved towards each other during their reciprocation, and a second pair of rollers for operating on the material after it has been acted on by said first mentioned pair of rollers and said frame.

14. In a dough working machine, the combination with a source of dough supply, of two separate sheeting means adapted to work said dough into a continuous dough sheet, and means for folding said dough sheet transversely of its length intermediate of said two sets of sheeting means, comprising a reciprocally propelling agent having faces for engaging the dough sheet as it is travelled therebetween, said faces being held fixedly apart during the reciprocation of said agent.

15. In a dough working machine, a pair of rollers, means for receiving and folding the dough in layers after it has passed between said rollers comprising a frame swinging from a single fulcrum and bearing a pair of driven endless aprons, and a conveyor for receiving the folded dough layers.

16. In a dough working machine, a pair of rollers, means for receiving and folding the dough in layers after it has passed between said rollers comprised of a pair of endless belts having their opposing surfaces held a fixed distance apart, a conveyor for receiving the folded dough layers, and a second pair of rollers arranged at right angles to said first mentioned rollers in communication with the discharge end of said conveyor.

17. In a dough working machine, a dough folding mechanism comprised of a depending frame bearing a pair of horizontally alining stub shafts, bearings for said shafts, a pinion loosely mounted on one of said shafts, a driving gear in mesh with said pinion, a pair of endless conveyors mounted in said frame, a driving shaft for each of said conveyors, a gear in mesh with said pinion secured to one of said shafts, said gear bearing shaft bearing another gear at its opposite end, a gear mounted on said other shaft in mesh with said last mentioned gear, and means for imparting swinging movement to said frame.

18. In a dough working machine, a swinging propelling agent having a pair of opposing dough engaging faces between which the dough is travelled, said faces being held fixedly apart during the swinging of said agent, and swinging means for said agent.

CHARLES KERN.
AUGUST KAMINSKI.